United States Patent

[11] 3,607,093

| [72] | Inventor | Ellery W. Stone<br>Cohassett, Mass. |
|---|---|---|
| [21] | Appl. No. | 705,603 |
| [22] | Filed | Feb. 15, 1968 |
| [45] | Patented | Sept. 21, 1971 |
| [73] | Assignee | Schering Corporation<br>Bloomfield, N.J. |

[54] DEVICES FOR TESTING BIOLOGICAL LIQUIDS
7 Claims, No Drawings

[52] U.S. Cl............................................................ 23/253,
23/230, 195/103.5, 195/127
[51] Int. Cl............................................................ C12k 1/04,
G01n 31/14, G01n 33/16
[50] Field of Search.......................................... 23/253 TP,
230 B; 195/103.5, 127; 210/23, 321, 501, 502, 506

[56] References Cited
UNITED STATES PATENTS

| 3,092,465 | 6/1963 | Adams, Jr. et al. | 23/253 TP |
| 3,298,789 | 1/1967 | Mast.............................. | 23/253 TP |
| 3,418,083 | 12/1968 | Rey et al........................ | 23/253 TP |

FOREIGN PATENTS

| 659,059 | 3/1963 | Canada ........................ | 195/63 |

*Primary Examiner*—Joseph Scovronek
*Attorney*—Stowell & Stowell

ABSTRACT: Testing devices for biological liquids comprise liquid permeable membranes of uniform chemical composition having a solid diagnostic reagent composition incorporated in at least a portion thereof and having at least one surface portion impenetrable by particles of the order of size of red blood corpuscles. The membranes may be of substantially uniform porosity throughout or they may have a thin skin portion of low effective porosity and a thicker body portion having pores of substantially large effective diameters.

DEVICES FOR TESTING BIOLOGICAL LIQUIDS

The invention relates to a device for testing biological liquids.

A principal purpose of the invention is to provide a rapid and convenient testing device for biological liquids which has a high sensitivity of response while requiring a minimum of the liquid to be tested.

A further purpose of the invention is to provide a testing device effective in the testing of biological liquids carrying colored substances of large size or high molecular weight, such as blood, whereby interference with tests involving color reactions by such colored substances in the liquid being tested can be avoided.

These and other purposes are attained by the test devices of the invention which comprises liquid permeable membranes of uniform chemical composition including in at least a portion of the membranes a solid diagnostic reagent composition and having at least one surface portion impenetrable by particles of large size or high molecular weight.

The liquid permeable membranes are typically thin pieces of thin thermoplastic substances, such as polyolefins or polyvinylchloride. The membranes are of uniform chemical composition throughout and may be of uniform structure having no portions of pore size as large as the interfering particles or substances to be excluded or one or both of the surface portions of the membrane may be of such finer structure than the remaining portions of the membrane as to exclude from such remaining portions interfering particles or substances contained in liquids to be tested brought into contact with such surface portions.

The devices of the invention are particularly useful in testing blood for constituents of diagnostic significance such as glucose, bilirubin and alcohol. It may also be possible to develop test devices for galactose and cholesterol by impregnating the test membranes with appropriate oxidase enzymes in a color-forming reaction mixture similar to that used for detecting glucose as described below. For use in the testing of blood at least one surface portion of the test membrane should be impermeable to red blood cells which are approximately 6 to 8 microns in diameter and for some tests the exclusion of hemoglobin molecules which have an effective diameter of the order of somewhat more than 60A is desirable. In order to prevent the sticking of red blood cells on the surface of the membrane to which the blood test sample is applied it is desirable that this surface have an effective roughness less than about 5 microns. That is, the surface of the membrane has substantially no surface roughness larger than the size of red blood corpuscles so that red blood cells can be removed from the surface by wiping with a tissue. In one form of the invention the test membrane is penetrable by particles not exceeding about 20,000 in molecular weight and impenetrable by particles exceeding about 50,000 in molecular weight.

The following examples are illustrative of the principles of the invention:

I. BLOOD GLUCOSE TEST MEMBRANES

A glucose test composition suitable for use in preparing the test membranes of the invention is prepared as follows:

One gram of glucose oxidase and 20 mg. of peroxidase are stirred and ground with 7 ml. of water to form a brown solution which is transferred to a 50 ml. beaker with 5 ml. of water. In a separate vessel 4.5 ml. of o-tolidine solution (2.0 g. of o-tolidine·2HCl in water to make 100 ml.) and 6 ml. of citrate buffer (24.2 g. of citric acid · $H_2O$ and 111 g. of sodium citrate · $H_2O$ in water to make 300 ml.) are mixed. A white precipitate forms which dissolves on adding 5 ml. of ethanol and warming. The tolidine-buffer solution is added to the enzyme solution with rapid stirring. The mixture is warmed to 40° C. and filtered through Whatman 041 or other fast filter paper. Strips of thin thermoplastic diffusion membrane such as Metricel PEM cellulose triacetate diffusion sheet, obtainable from Gelman Instrument Company of Ann Arbor, Michigan, are soaked in the warm filtrate for 20 minutes. The strips are then removed, excess solution is blotted off the surface with filter paper and the strips are air dried for at least 10 minutes at room temperature. The dried strips are stored in dark bottles, preferably in the presence of a desiccant.

In using the strip a drop of blood from a fingertip puncture is placed on the strip, allowed to stand for about 2 minutes, the residual blood is wiped off and the color compared with a standard color chart. A blue color develops within 30 seconds after the application of blood containing 100 mg. percent of glucose and substantially full intensity is attained in 2 minutes.

The Metricel PEM membrane has pores of an effective diameter of approximately 0.075 microns. Other membranes which can be used in place of the Metricel PEM are Millipore OH which is a polyethylene diffusion sheet and Millipore BS which is a polyvinylchloride diffusion sheet. The Millipore sheets have pores in the range of 0.45 to 2 microns which are small enough to exclude red blood cells and have surfaces from which red blood cells can readily be wiped. A thermoplastic diffusion membrane, available from Amicon Corporation, of Lexington, Massachusetts, under the name XM-50, has a thin surface skin permeable to solutions of low molecular weight substances, such as glucose, but impermeable to macromolecules such as proteins also provides very desirable membranes for the test devices of the invention. The surface skin typically is less than 0.5 micron thick and has an effective pore size of about 3 millimicrons while the remainder of the membrane is from 100 to 150 microns thick and has an effective pore size of about 5 microns in diameter.

Another thermoplastic diffusion membrane, made by Amicon Corporation, designated SM-100, is also useful for preparing blood glucose test devices. The SM-100 differs from the XM-50 mainly in that the effective pore size near the skin is larger, but still small enough to prevent staining by red cells or hemoglobin when blood is wiped from the test membrane.

II. BILIRUBIN TEST MEMBRANES

Devices of the invention suitable for detecting the presence of bilirubin in body fluids such as blood, serum, or urine can be made by impregnating Millipore PEM or Millipore BS diffusion sheets with a reagent which when wet by blood, serum, or urine containing bilirubin gives a characteristic color reaction.

A useful reagent is obtained by mixing 0.6 mg. of P-sulfobenzenediazonium 4-nitrotoluene-2-sulfonate with 100 mg. of sulfosalicylic acid or other normally solid acid of similar strength, impregnating the Millipore sheets with a solution or paste of the mixture and drying the impregnated sheets. When a piece of the sheet material is wetted with serum containing bilirubin a purple color varying in intensity in proportion to the amount of bilirubin present develops rapidly.

An alternative form of the bilirubin test device may be made by soaking the Millipore sheets in a solution of 1 g. of ferric chloride and 25 g. of trichloroacetic acid in 14 ml. of water and wiping and drying the sheets.

I claim:

1. A testing device for biological liquids comprising a liquid permeable membrane of uniform chemical composition including in at least a portion thereof a solid diagnostic reagent composition and having at least one surface the pores of which are less than about 3 microns in effective pore diameter and impenetrable by particles of the order of size of red blood corpuscles.

2. A testing device as defined in claim 1 wherein said one surface of the membrane has substantially no surface roughness larger than the size of red blood corpuscles.

3. A testing device as defined in claim 1 wherein said one surface of the membrane is impenetrable by particles of the order of size of hemoglobin molecules.

4. A testing device as defined in claim 1 wherein said one surface of the membrane is penetrable by particles not exceeding about 20,000 in molecular weight and impenetrable by particles exceeding about 50,000 in molecular weight.

5. A testing device as defined in claim 1 wherein a portion of the membrane other than said one surface is penetrable by particles substantially larger than particles capable of penetrating said one surface.

6. A testing device as defined in claim 1 wherein at least the portion of the membrane other than said one surface includes therein a solid diagnostic reagent composition.

7. A testing device as defined in claim 1 wherein the diagnostic reagent composition is responsive by a color change to the presence of glucose in biological liquids in contact with the membrane.